7662X
A. G. Hull,
Truss.
Patented July 5, 1833.
No. 1.
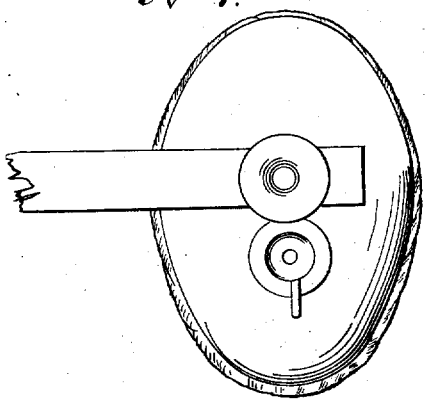
No. 2.
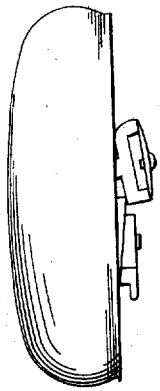
AM. PHOTO-LITHO. CO. N.Y. (OSBORNE'S PROCESS.)

1/5/1833 7662X

Amos G. Hull.

Letters Patent.

The Schedule referred to in these Letters Patent, and
making part of the same, containing a description in the words of the said
Amos G. Hull himself, of his improvement "in the surgical instru-
ment called the Truss to be used in varicocele, and in some cases
of Femoral, & Scrotal Hernia."

This improvement is intended particularly for the cure of Varicocele
which is an enlargement of the blood vessels connected with spermatic
chord. In the application of the truss to this disease, the object is to com-
press the enlarged blood vessels, so as nearly to close up their calibre, for
which purpose, the diseased vessels which lie in the cavity of the
Scrotum & the bag containing the Testicles must be gathered & raised
up under the integuments, and brought opposite the abdominal ring
when they may be subjected to pressure by applying the pad directly
upon them. The form and structure of the parts to which the pad is appli-
ed in a case of varicocele, are such that a flat or even convex
pad may be used with success. The lower portion of the pad ought to
press upon the bone called in books of Anatomy "os pubis" at that
place where the spermatic chord runs over that bone, it is essential
to the successful application of this instrument, that the degree of pres-
sure made upon the chord should be diminished or increased by the
patient according to his sensations in the seat of the disease it being
important to avoid injury to the nerve whilst it is indispensable
however, to make pressure sufficient to prevent the swelling of those
blood vessels, which constitutes the disease. To accomplish this
object, a contrivance has been made by this applicant which is
to be used in connection with the instrument for which this applicant
[illegible] bearing date August 17th A.D. 18[illegible], as an instrument embra-
cing the [illegible] parts thereof the most important of which is the manner connection of the spring to the pad by means of a metallic head or button
through which the spring passes, & the pivot passing through the pad
plate upon which the button is moveable to a limited extent, any other
mechanical means by which the planes of the steel spring and pad
plate may be inclined to each other at different angles with moveable
pivot, if combined with a joint or pivot button upon the principle
described in the before mentioned Patent of this applicant. To the
parts before described this applicant has added a circular wedge the
operation of which is to depress the lower portion of the pad, which
is applied to the varicocele. This wedge is a metallic plate of
[illegible] inch in diameter & ¼ of an inch in thickness on the upper surface
of which the margin is cut away was to form a spiral inclined
plane, of about one eighth of an inch in width. It is placed on the
pad plate at such distance from the centre as to bring the margin of
the wedge which forms the inclined plane under the button
head and is attached to the pad plate by a rivet of iron or a
screw round which it revolves like a wheel round its axle. By a
revolution of this circular wedge, the plane of the spring to which
the pad is attached is made to form an angle with the plane of the
pad of from one, to twenty five degrees. By this feature the patient
is enabled to increase or diminish the pressure of the lower edge
of the pad which presses upon the spermatic chord as the exigency
of his case may require. For a more explicit understanding of this
contrivance, reference is made to the drawing of the varicocele pad
hereto annexed which is to be taken as a part of this specification.
The feature in the specification described may also be applied
with success in some cases of Femoral & Ventral Hernia, where it
is necessary to vary the degree of pressure more than can be done by
the instrument commonly used in those kinds of Hernia.
New York June 8th 18[illegible]

Witnesses — Amos G. Hull
[illegible]
[illegible]

(Dr in portfolio)

754